United States Patent
Janus

(10) Patent No.: US 7,219,170 B2
(45) Date of Patent: May 15, 2007

(54) BURST TRANSFER REGISTER ARRANGEMENT

(75) Inventor: Scott R. Janus, Rocklin, CA (US)

(73) Assignee: Intel Corporation, Santa Clara, CA (US)

( * ) Notice: Subject to any disclaimer, the term of this patent is extended or adjusted under 35 U.S.C. 154(b) by 377 days.

(21) Appl. No.: 10/728,677

(22) Filed: Dec. 4, 2003

(65) Prior Publication Data

US 2005/0122329 A1    Jun. 9, 2005

(51) Int. Cl.
    *G06F 13/00* (2006.01)
(52) U.S. Cl. ......................... 710/32; 710/32
(58) Field of Classification Search ............ 710/5, 710/22, 52, 32–35; 711/167, 305; 365/200, 365/189, 225, 49, 230; 345/539
    See application file for complete search history.

(56) References Cited

U.S. PATENT DOCUMENTS

| | | | |
|---|---|---|---|
| 5,347,634 A * | 9/1994 | Herrell et al. .............. | 345/539 |
| 5,644,784 A * | 7/1997 | Peek ........................... | 710/24 |
| 5,765,022 A * | 6/1998 | Kaiser et al. ................. | 710/22 |
| 6,229,759 B1 * | 5/2001 | Morgan ....................... | 365/236 |
| 6,357,009 B1 * | 3/2002 | Giles et al. ................... | 726/34 |
| 6,587,390 B1 * | 7/2003 | Lin ........................ | 365/230.02 |
| 2005/0073695 A1 * | 4/2005 | Nacman et al. .............. | 358/1.2 |

OTHER PUBLICATIONS

Video Electronics Standards Assoc. (VESA), "Display Data Channel Command Interface (DDC/CI) Standard", Version 1, Aug. 14, 1998, 43 pages.
Video Electronics Standards Assoc. (VESA), "Enhanced Display Data Channel Standard", Version 1, Sep. 2, 1999, 21 pages.
Video Electronics Standards Assoc. (VESA), "VESA Monitor Control Command Set (MCCS) Standard", Version 2, Oct. 17, 2003, 42 pages.

* cited by examiner

*Primary Examiner*—Christopher Shin
(74) *Attorney, Agent, or Firm*—Ram P. Yadav

(57) ABSTRACT

Machine-readable media, methods, and apparatus are described to burst write a command and its arguments to control registers of a device and to burst read status and outputs of the command from control registers of the device. During the burst write, the arguments may be transferred to the device in a reverse order in which the last argument is transferred first and the first argument is transferred last. Further, the command may be transferred after the arguments.

29 Claims, 3 Drawing Sheets

BURST TRANSFER REGISTER ARRANGEMENT

BACKGROUND

A bus of a computing device may support burst writes wherein multiple writes to contiguous addresses may be performed with a single write to a first address of the contiguous addresses. A burst write to transfer data may take less time to complete than multiple writes to transfer the same data. Similarly, a bus of a computing device may also support burst reads wherein multiple reads from contiguous addresses may be performed with a single read from a first address of the contiguous addresses. A burst read to transfer data may take less time to complete than multiple reads to transfer the same data. Burst writes and bursts reads may therefore improve performance of the computing device.

Further, a computing device may include several devices to perform certain functions. For example, the computing device may include a graphics card to generate video signals, a network card to interface with a network, and a sound card to generate audio signals. These devices often include registers via which the device may be configured and/or controlled. In particular, the commands and arguments may be written to these registers in order to request the device to execute the command using the supplied arguments. Further, these registers may be read in order to obtain status and output from the command. If writing to and/or reading from these registers may be done in bursts, then the computing device may increase overall performance levels.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes register arrangement and burst transfer techniques. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

Figure 1:
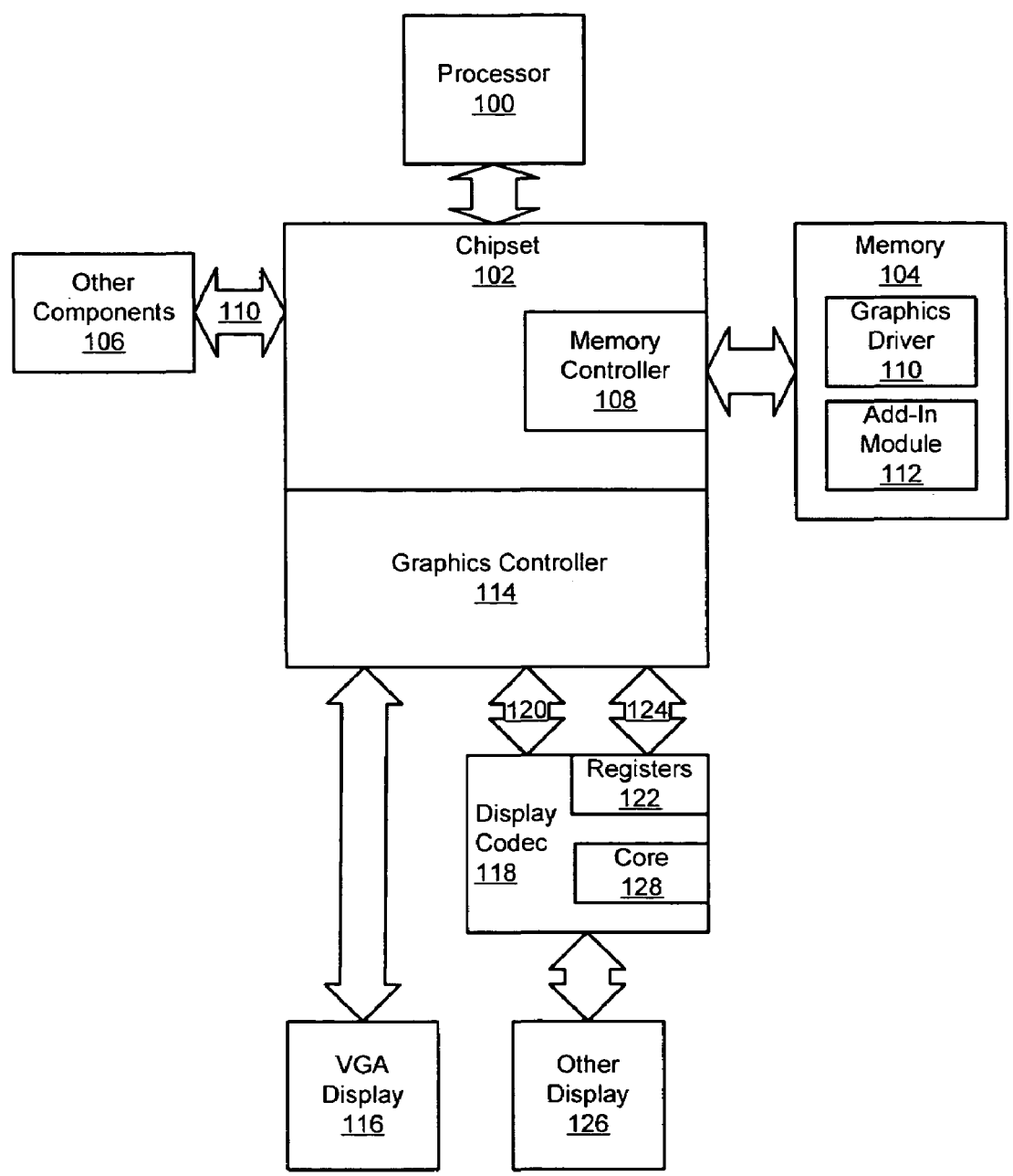
FIG. 1 illustrates an embodiment of a computing device with an integrated graphics controller chipset.

An embodiment of a computing device is shown in FIG. 1. The computing device may comprise one or more processors 100 and a chipset 102. The chipset 102 may include one or more integrated circuit packages or chips that couple the processor 100 to a memory 104. The chipset 102 may further couple the processor 100 to other components 106 such as, for example, BIOS firmware, keyboards, mice, storage devices, network interfaces, etc. via one or more buses.

The chipset 102 may comprise a memory controller 108 to read from and/or write data to the memory 104 in response to read and write requests of the processor 100 and/or other components of the computing device. The memory 104 may comprise one or more memory devices that provide addressable storage locations from which data may be read and/or to which data may be written. The memory 104 may also comprise one or more different types of memory devices such as, for example, DRAM (Dynamic Random Access Memory) devices, SDRAM (Synchronous DRAM) devices, DDR (Double Data Rate) SDRAM devices, or other volatile and/or non-volatile memory devices. In one embodiment, the memory 104 may store a graphics driver 110 and an add-in module 112 which the processor 100 may execute in order to control the operation of a graphics controller.

As depicted, the chipset 102 may comprise an integrated graphics controller 114. In one embodiment, the graphics driver 110 may request the graphics controller 114 to generate an analog display signal suitable for a conventional display monitor 116 such as, for example, a VGA (Video Graphics Array) CRT (cathode ray tube) monitor. Similarly, the graphics driver 110 may request the graphics controller 114 to generate pixel data and provide the generated pixel data to a display codec 118. In one embodiment, the graphics controller 114 may provide the display codec 118 with the pixel data via a DVO (Digital Video Output) port or an SDVO (Serial Digital Video Output) port and associated video interface bus 120.

Further, the add-in module 112 may control the operation of the display codec 118 and may request information from the display codec 118. In one embodiment, the add-in module 112 may request the graphics controller 114 to write a command and arguments to control registers 122 of the display codec 118 in order to control the operation of the display codec 118 and/or to request information from the display codec 118. The add-in module 112 may further request the graphics controller 114 to read status and/or outputs from the control registers 122 of the display codec 118. In one embodiment, the graphics controller 114 may read from and write to the control registers 122 of the display codec 118 via a control bus 124 such as, for example, an I2C (Inter Integrated Chip) bus.

The display codec 118 may receive the pixel data from the graphics controller 114 via the video interface bus 120 and may generate video signals representative of the pixel data that is suitable for other displays 126. In particular, the display codec 118 may comprise core logic 128 to generate television signals such as, for example, SDTV (standard definition television) signals and HDTV (high definition television) signals suitable for a television display. The core logic 128 of the display codec 118 may also generate digital video signals such as, for example, digital video interface signals for flat panel displays or digital CRT signals for digital CRT monitors. Further, in response to a command and its arguments being stored in the control registers 122, the core logic 128 may execute the command in accordance with its arguments and may store status and outputs of the command in the control registers 122.

In one embodiment, the display codec 118 may be mounted to a motherboard or mainboard (not shown) of the computing device. In another embodiment, the display codec 118 may be mounted to an add-in card such as, for example, an ADD (Advanced Digital Display) card that may be inserted into an AGP port (not shown) of the computing device or an ADD2 (Advanced Digital Display 2) card that may be inserted into a PCI Express port (not shown) of the computing device.

Figure 2:
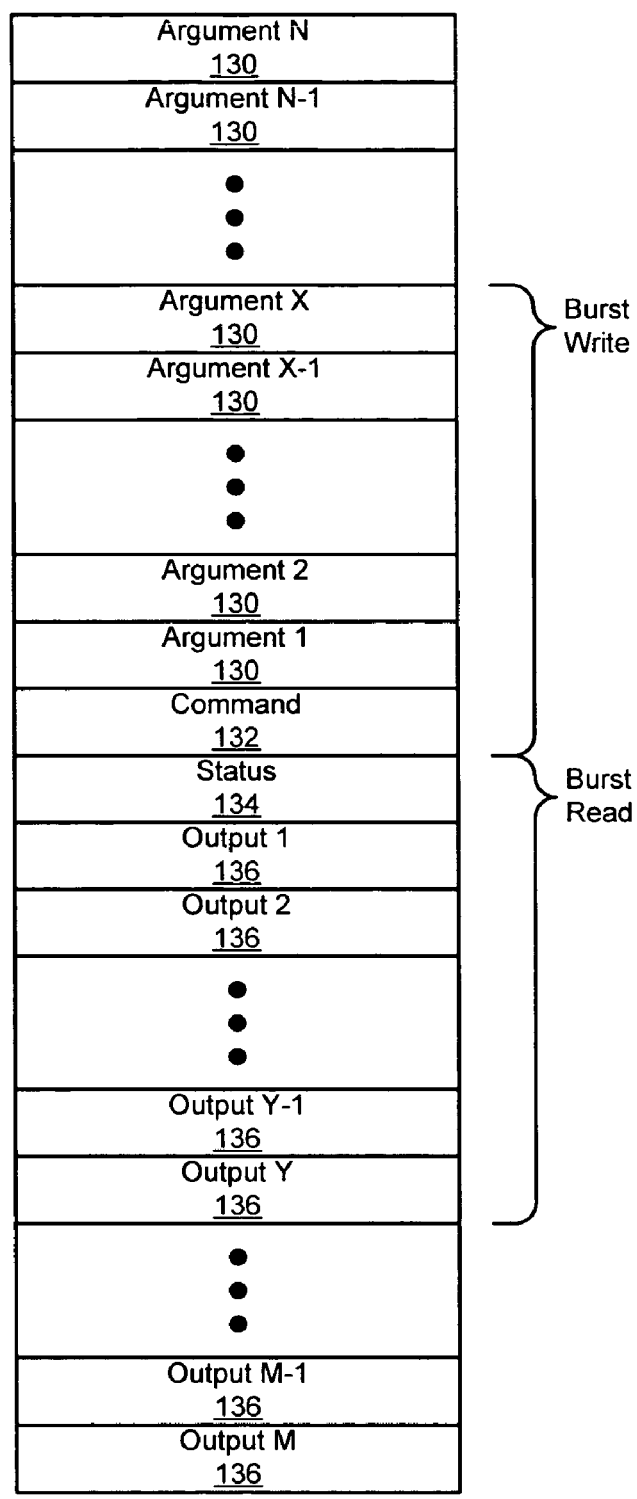
FIG. 2 illustrates an embodiment of a register arrangement to permit a burst write of commands and their arguments which may vary in number.

One possible arrangement of some registers of the control registers 122 of the display codec 118 is shown in FIG. 2. In particular, the depicted arrangement supports a burst write of a command and its arguments to the appropriate control registers 122 and a burst read of status and outputs of the command from the appropriate control registers 122. However, other arrangements of the control registers 122 are contemplated by the present invention and appended claims. Further, it should be appreciated that the register arrangement of FIG. 2 may also be used by devices and buses other than display codecs and control buses.

As depicted, the control registers 122 may comprise argument registers $130_1 \ldots 130_N$ and a command register 132. The argument registers $130_1 \ldots 130_N$ may store arguments of a command and the command register 132 may store a command. As indicated above, writing a command to the command register 132 of the display codec 118 may trigger execution of the command in one embodiment. Accordingly, the graphics controller 114 may write any arguments for the command to the appropriate argument registers $130_1 \ldots 130_N$ prior to writing the command to the command register 132.

In one embodiment, the argument registers $130_1 \ldots 130_N$ and the command register 132 are contiguously writable with the argument registers $130_1 \ldots 130_N$ arranged in a reverse order followed by the command register 132. In particular, the address of first argument register $130_1$ may be greater than the address of the second argument $130_2$, the address of the second argument register $130_2$ may be greater than the address of the third argument register $130_3$, and so on. Further, the address of the command register 132 may be greater than the address of the first argument register $130_1$ thus resulting in the address of the command register 132 coming after the addresses of the argument registers $130_1 \ldots 130_N$.

As a result of such an arrangement, a single burst write of a command and its X arguments may start from the address of the Xth argument register $130_X$ and may respectively store the Xth arguments to the first argument in the argument registers $130_X \ldots 130_1$ and a command in the command register 132 regardless of whether the command has 0 arguments, N arguments, or some quantity of arguments between 0 and N. For example, the graphics controller 114 may request the display codec 118 to execute a command having three arguments by issuing a single burst write of the three arguments and the command to the address of the third argument register $130_3$ thus resulting in the three arguments registers $130_3, 130_2, 130_1$, respectively storing the third argument, second argument, and first argument of the command and the command register 132 storing the command.

The register arrangement may further comprise a status register 134 and output registers $136_1 \ldots 136_M$. The status (e.g. OK, In Process, Error) of a command may be stored in the status register 134. Further, any outputs of the command may be stored in the output registers $136_1 \ldots 136_M$ by placing the first output in the first output register $136_1$, the second output in the second output register $136_2$ and so on until the last output of the command is stored in the Yth output register $136_Y$.

In one embodiment, the status register 134 and the output registers $136_1 \ldots 136_M$ are contiguously readable with the status register 134 followed by the output registers $136_1 \ldots 136_N$. In particular, the address of status register 134 may be less than the address of first output register $136_1$, the address of the first output register $136_1$ may be less than the address of the second output register $136_2$, and so on. As a result of such an arrangement, a single burst read may start from the address of the status register 134 may read status from the status register 134 and outputs from the first output register $136_1$ to the last output register $130_Y$ associated with the command regardless of whether the command has 0 outputs, M outputs, or some quantity of outputs between 0 and M. For example, the graphics controller 114 may obtain from the display codec 118 the status and outputs of a command having two outputs by issuing a single burst read that starts from the address of the status register 134 and stops after reading the second output register $136_2$.

Figure 3:
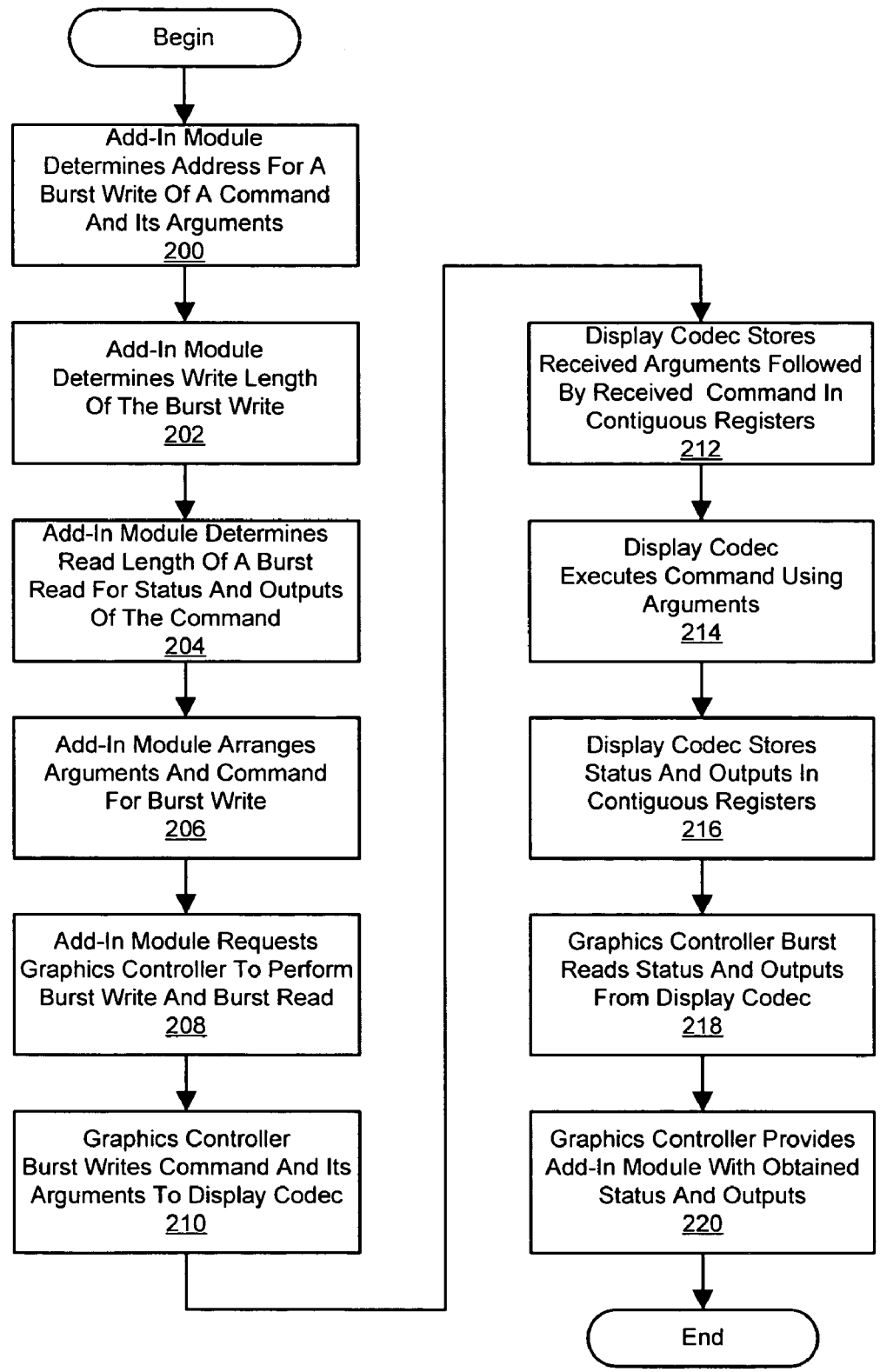
FIG. 3 illustrates an embodiment of a method to burst write a command and its arguments and to burst read status and outputs of the command.

An embodiment of a method to burst write a command and its arguments to a display codec 118 and to burst read status and outputs of the command from the display codec 118 is shown in FIG. 3. In block 200, the processor 100 in response to executing the add-in module 112 may determine an address of the display codec 118 to which a burst write of a command and its arguments may be directed. In one embodiment, the processor may determine an argument count for the command that is indicative of the number of arguments for the command and may select the address of the argument register 130 that corresponds to the argument count. For example, if the command has two arguments, then the processor may select the address of the second argument register $130_2$.

The add-in module 112 in block 202 may further cause the processor 100 to determine a write length of the burst write and a length of a corresponding burst read. In one embodiment, the write length may represent the number of registers to be written during the write burst. Accordingly, the processor 100 may determine the write length by simply incrementing the argument count by one to account for the command. The processor 100 in response to executing the add-in module 112 may further determine in block 204 a read length for a read burst used to obtain status and outputs of the command. In one embodiment, the read length may represent the number of registers to be read during the read burst. Accordingly, the processor 100 may obtain the read length by determining an output count for the command that is indicative of the number of outputs to be generated by the command and incrementing the output count by one to account for the status of the command.

In block 206, the add-in module 112 also cause the processor 100 to arrange the command and its arguments for the burst write. In one embodiment, the processor 100 may contiguously store the arguments in memory 104 in a reverse order in which the last argument is stored first and the first argument is stored last. Further, the processor may store the command after the reversed arguments. After arranging the arguments and command, the processor 100 in block 208 may request the graphics controller 114 to burst write the arguments and command to the address determined in block 200 and to burst read the status and outputs of the command from the address associated with the status register 134. To this end, the processor 100 may provide the graphics controller 114 with the address determined in block 200, the address of the status register 134, the write length, and the read length.

In response to the request, the graphics controller 114 in block 210 may burst write the arguments and command to the display codec 118. In one embodiment, the graphics controller 114 may retrieve the arguments and command from the memory 104 and may start writing from the address determined in block 200 and stopping after writing to the command register 132 as indicated by the write length determined in block 202. During the burst write, the graphics controller 114 may transfer the arguments and command across the control bus 124 to the display codec 118 in the order that the processor 100 arranged the arguments and command in the memory 104.

In one embodiment, the burst write results in the display codec 118 receiving the arguments in reverse order. In particular, the last received argument corresponds to the first argument of the command, the next to last received argument corresponds to the second argument of the command, etc. with the first received argument corresponding to the last argument of the command. The display codec 118 in block 212 may store the received arguments in the argument registers $130_1 \ldots 130_X$ and the received command in the command register 132. In particular, the display codec 118 may store the first received argument in the Xth argument register $130_X$ per the address determined in block 200, may store the second received argument in the next argument register $130_{X-1}$, and so on until the display codec 118 stores the last received argument in the first argument register $130_1$. Further, the display codec 118 may receive the command after the arguments and may store the received command in the command register 132.

In response to storing the command in the command register 132, the core logic 128 may execute the command in accordance with the arguments stored in the argument registers $130_1 \ldots 130_X$ (block 214). Upon completing the command, the core logic 128 in block 216 may store status and outputs of the command in the status register 134 and output registers $136_1 \ldots 136_Y$.

The graphics controller 114 after waiting a predetermined amount of time after the burst write may burst read the status and outputs from the display codec 118 via the control bus 124 (block 218). In one embodiment, the graphics controller 114 during the burst read may start reading from the status register 134 and continuing reading from the first output registers $136_1$ to the Yth output register $136_Y$ associated with the last output of the command. In particular, the graphics controller 114 may identify the Yth output register $136_M$ based upon the read length supplied by the processor 100. By first reading the status, the graphics controller 114 may abort the burst read based upon the status before reading all outputs of the command. For example, if the status indicates that the display codec 118 has yet to complete the command, then the graphics controller 114 may abort the burst read before reading all the output registers $136_1 \ldots 136_Y$ associated with the command and retry the burst read at a later time when the display codec 118 has likely completed execution of the command.

Finally, the graphics controller 114 in block 220 in response to receiving the status and outputs from the display codec 118 may return the status and outputs to the add-in module 112 for further processing and/or analysis.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method comprising
   determining an address for a burst write of a command and arguments of the command based upon an argument count of the command, and
   in response to performing the burst write, writing the arguments and the command starting from the address determined based upon the argument count.

2. The method of claim 1 wherein writing the arguments and the command comprises writing the arguments prior to writing the command.

3. The method of claim 1 wherein writing the arguments and the command comprises writing the arguments in a reverse order that results in a last argument of the command being written prior to a first argument of the command being written.

4. The method of claim 3 wherein writing the arguments and the command further comprises writing the command after writing the arguments.

5. The method of claim 1 further comprising performing a burst read of status and any outputs of the command.

6. The method of claim 5 wherein performing the burst read comprising reading the status prior to reading the any outputs.

7. The method of claim 5 further comprising determining an output count that is indicative of a number of outputs to be generated as a result of the command, wherein performing the burst read ends based upon the output count.

8. A method comprising
receiving a plurality of arguments of a command during a burst write to a device to execute the command, and
after receiving the plurality of arguments, receiving the command during the burst write to the device to execute the command.

9. The method of claim 8 wherein receiving comprises receiving the plurality of arguments in a reverse order in which a last argument of the command is received prior to receiving a first argument of the command.

10. The method of claim 8 further comprising storing the plurality of arguments and the command in contiguously writable registers of the device to execute the command.

11. The method of claim 8 further comprising executing the command based upon the plurality of arguments in response to the device receiving the command.

12. The method of claim 11 further comprising storing status and outputs resulting from executing the command in contiguously readable registers of the device that executed the command.

13. The method of claim 11 further comprising receiving a burst read for status and outputs of the command, and transferring the status of the command during the burst read, and after transferring the status, transferring the outputs of the command.

14. An apparatus comprising
a command register to store a command,
a plurality of argument registers to store arguments of the command,
logic to execute the command based upon the arguments,
wherein the plurality of argument registers and the command register are contiguously writable and are arranged such that a burst write of a command and its arguments results in the arguments of the command being stored in the plurality of argument registers before the command is stored in the command register.

15. The apparatus of claim 14 wherein the command register follows the plurality of argument registers.

16. The apparatus of claim 15 wherein the plurality of argument registers are arranged in a reverse order that results in a last argument of the command being stored before a first argument of the command is stored.

17. The apparatus of claim 14 further comprising a status register to store status of the command, and a plurality of output registers to store any outputs of the command, wherein the status register and plurality of output registers are contiguously readable.

18. The apparatus of claim 14 wherein the status register and the plurality of output registers are arranged such that the status is transferred prior to the any outputs of the command in response to a burst read.

19. A tangible machine-readable medium comprising
a plurality of instructions that, in response to being executed, result in a computing device determining an address for a burst write of a command and arguments of the command based upon an argument count of the command, and
in response to performing the burst write, writing the arguments and the command starting from the address determined based upon the argument count.

20. The tangible machine-readable medium of claim 19 wherein the plurality of instructions further result in the computing device writing the arguments prior to writing the command.

21. The tangible machine-readable medium of claim 19 wherein the plurality of instructions further result in the computing device writing the arguments in a reverse order that results in a last argument of the command being written prior to a first argument of the command being written.

22. The tangible machine-readable medium of claim 19 wherein the plurality of instructions further result in the computing device writing the command after writing the arguments.

23. A system comprising
a display codec comprising a plurality of argument registers and a command register arranged to support burst writes of commands having different argument counts, and
a graphics controller to burst write the commands and their arguments to the plurality of argument registers and command registers of the display codec.

24. The system of claim 23 wherein the graphics controller further provides the graphics controller with pixel data via a video interface bus that couples the graphics controller and the display codec, and performs the burst write via a control bus that couples the graphics controller and the display codec.

25. The system of claim 23 wherein the control bus comprises an I2C bus.

26. The system of claim 23 wherein the plurality of argument registers and the command register are contiguously writable and the command register follows the plurality of arguments.

27. The system of claim 23 wherein the graphics controller during the burst write writes any arguments of a command to the plurality of argument registers of the display codec, and after writing the any arguments of the command to the plurality of argument registers, writes the command to the command register of the display codec.

28. The system of claim 23 wherein the graphics controller during the burst write writes a last argument of a command to the plurality of argument registers of the display codec before writing the first argument of the command to a first argument register of the plurality of argument registers, and after writing any arguments of the command to the plurality of argument registers, writes the command to the command register of the display codec.

29. The system of claim 23 wherein the display codec executes a command based upon its stored arguments in response to the command being stored in the command register.

\* \* \* \* \*